United States Patent
Huang

(10) Patent No.: US 6,904,531 B2
(45) Date of Patent: Jun. 7, 2005

(54) PORTABLE COMPUTER WITH LOW POWER CONSUMPTION OF A CARD BUS CONTROLLER THEREOF

(75) Inventor: Cheng-Liang Huang, Taipei (TW)

(73) Assignee: Mitac Technology Corp., Hsin-Chu (TW)

( * ) Notice: Subject to any disclaimer, the term of this patent is extended or adjusted under 35 U.S.C. 154(b) by 571 days.

(21) Appl. No.: 09/683,693

(22) Filed: Feb. 5, 2002

(65) Prior Publication Data

US 2003/0149901 A1 Aug. 7, 2003

(51) Int. Cl.$^7$ .............................. G06F 1/26; G06F 1/32
(52) U.S. Cl. ......................... 713/320; 713/2; 713/100; 713/340; 709/229
(58) Field of Search ........................... 713/2, 100, 320, 713/340, 300; 709/229, 221

(56) References Cited

U.S. PATENT DOCUMENTS

| | | | | |
|---|---|---|---|---|
| 4,088,878 A | * | 5/1978 | Schasser | 235/436 |
| 6,062,480 A | * | 5/2000 | Evoy | 235/492 |
| 6,459,235 B2 | * | 10/2002 | Odeohhara et al. | 320/116 |
| 6,804,300 B1 | * | 10/2004 | Hoshino et al. | 375/240.1 |

* cited by examiner

Primary Examiner—Rehana Perveen
(74) Attorney, Agent, or Firm—Winston Hsu

(57) ABSTRACT

The present invention provides a computer including a processor for controlling operation of the computer, a card bus slot connected with the processor for connecting to a PCMCIA card, a power supply for providing the PCMCIA card inserted into the card bus slot with electric power, a card bus controller connected with the processor for controlling the power supply and the PCMCIA card inserted into the card bus slot, and a detection circuit connected with the card bus slot for detecting whether the PCMCIA card is inserted into the card bus slot.

8 Claims, 2 Drawing Sheets

PORTABLE COMPUTER WITH LOW POWER CONSUMPTION OF A CARD BUS CONTROLLER THEREOF

BACKGROUND OF INVENTION

1. Field of the Invention

The present invention relates to a computer, and more particularly, to a portable computer, which can lower power consumption of a card bus controller.

2. Description of the Prior Art

Please refer to FIG. 1, which is a function block diagram of a prior art portable computer 10. The portable computer 10 comprises a processor 12 for controlling operation of the computer 10, two card bus slots 14 connected to the processor 12 for connecting to a PCMCIA card, a power supply 16 for providing the PCMCIA card inserted into the card bus slot 14 with electric power, and a card bus controller 18 connected to the processor 12 for controlling the power supply 16 and the PCMCIA cards inserted into the card bus slot 14. Furthermore, the processor 12 communicates with the card bus controller 18 via a peripheral component interconnect (PCI) bus 8.

The power supply 16 is capable of providing different voltages for different PCMCIA cards inserted into card bus slot 14 via ports 11, 13. The card bus controller 18 controls the power supply 16 through port 19 for providing the PCMCIA card with an optimum voltage according to the specification of the PCMCIA card inputted at ports 15, 17. However, the card bus controller 18 is always turned on no matter whether there is any PCMCIA card inserted into the card bus slot 14, and increases the power consumption of the computer 10.

SUMMARY OF INVENTION

It is therefore a primary objective of the claimed invention to provide a portable computer with a low power consuming card bus controller to solve the abovementioned problem.

Briefly, the claimed invention provides a computer comprising a processor for controlling operation of the computer, a card bus slot connected with the processor for connecting to a PCMCIA card, a power supply for providing the PCMCIA card inserted into the card bus slot with electric power, a card bus controller connected with the processor for controlling the power supply and the PCMCIA card inserted into the card bus slot, and a detection circuit connected with the card bus slot for detecting whether the PCMCIA card is inserted into the card bus slot.

When the detection circuit detects that the PCMCIA card has been inserted into the card bus slot, the card bus controller is turned on for making the power supply start to provide the PCMCIA card with electric power, and provides the PCMCIA card with corresponding services according to a specification of the PCMCIA card for making the PCMCIA card operate correctly. When the detection circuit detects that there is no PCMCIA card inserted into the card bus slot, the card bus controller is turned off for lowering power consumption.

It is an advantage of the claimed invention that the card bus controller is turned off when there is no PCMCIA card inserted into the card bus slot so that the power consumption is reduced in order to increase the length of use of a battery installed on the portable computer.

These and other objectives of the claimed invention will no doubt become obvious to those of ordinary skill in the art after reading the following detailed description of the preferred embodiment which is illustrated in the various figures and drawings.

DETAILED DESCRIPTION

Figure 1:
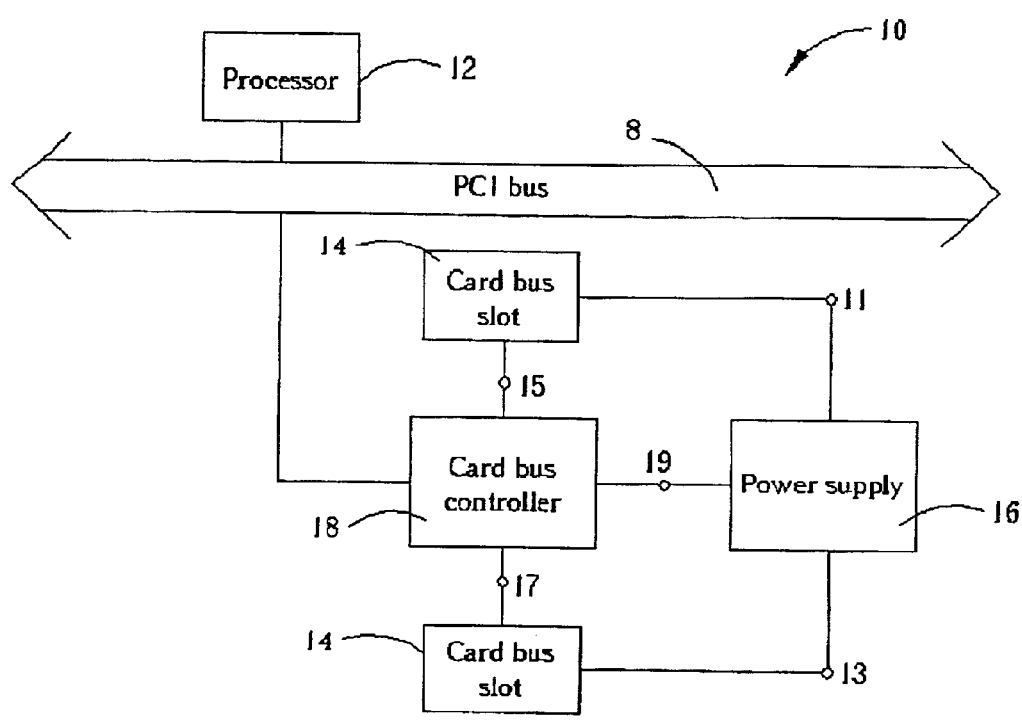
FIG. 1 is a function block diagram of a portable computer according to the prior art.
Figure 2:
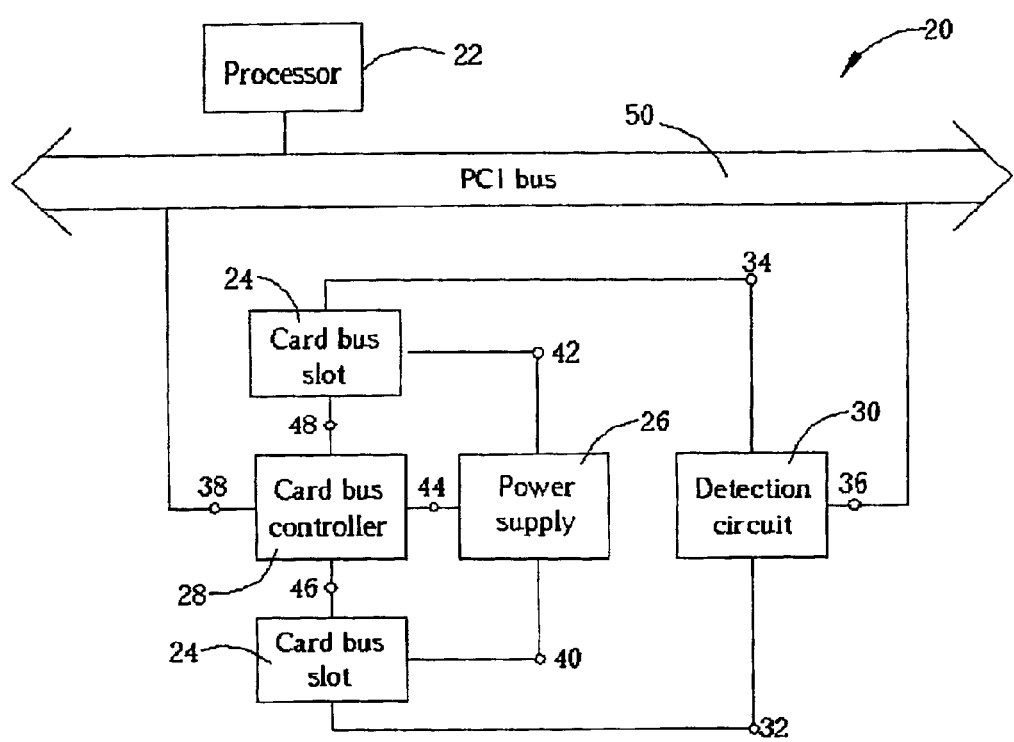
FIG. 2 is a function block diagram of a portable computer according to the present invention.

Please refer to FIG. 2. FIG. 2 is a function block diagram of a portable computer according to the present invention. The present invention discloses a computer device concerning a portable computer 20. The portable computer 20 comprises a processor 22 for controlling operation of the portable computer 20, two card bus slots 24 connected to the processor 22 for connecting to a PCMCIA card, a power supply 26 for providing the PCMCIA card inserted into the card bus slot 24 with electric power, a card bus controller 28 connected to the processor for controlling the power supply and the PCMCIA card inserted into the card bus slot, and a detection circuit 30 connected with the card bus slot 24 and the processor 22 for detecting whether the PCMCIA card is inserted into the card bus slot 24. Furthermore, the processor 22 communicates with the card bus controller 28 via a peripheral component interconnect (PCI) bus 50.

When the detection circuit 30 detects that one PCMCIA card has been inserted into one of the two card bus slots 24 from ports 32, 34, the detection circuit 30 will send a check signal to port 36 for informing the processor 22 about an insertion of the PCMCIA card, and the processor 22 turns on the card bus controller 28 via port 38 according to the check signal. The power supply 26 is capable of providing the PCMCIA card with different voltages via ports 40, 42, and the card bus controller 28 controls the power supply 26 via port 44 for providing the PCMCIA card connected to port 46 or port 48 with an optimum voltage according to a specification of the PCMCIA card so as to make the PCMCIA card operate normally.

When the detection circuit 30 detects that there is no PCMCIA card inserted into the card bus slots 24, the detection circuit 30 will generate the check signal via port 36 for informing the processor 22 that there is no PCMCIA card inserted into the card bus slots 24. The processor 22 will then turn off the card bus controller 28 via the port 38 according to the check signal in order to lower power consumption.

In contrast to the prior art portable computer, the portable computer 20 according to the present invention comprises the detection circuit 30 for detecting ports 32, 34 and sending a corresponding check signal to port 36 for informing whether the PCMCIA card is inserted into the card bus slot 24. When the detection circuit 30 detects via ports 32, 34 that there is no PCMCIA card inserted into the card bus slot, the processor 22 turns off the card bus controller 28 via the port 38. Therefore, the portable computer 20 according to the present invention can lower power consumption with the help of the detection circuit 30.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A computer comprising:
 a processor for controlling operation of the computer;
 a card bus slot connected with the processor for connecting to a PCMCIA card;
 a power supply for providing the PCMCIA card inserted into the card bus slot with electric power;
 a card bus controller connected with the processor for controlling the power supply and the PCMCIA card inserted into the card bus slot;
 a detection circuit connected with the card bus slot for detecting whether the PCMCIA card is inserted into the card bus slot;
 wherein when the detection circuit detects that the PCMCIA card has been inserted into the card bus slot, the card bus controller is turned on for making the power supply start to provide the PCMCIA card with electric power, and provides the PCMCIA card with corresponding services according to a specification of the PCMCIA card for making the PCMCIA card operate correctly, and when the detection circuit detects that there is no PCMCIA card inserted into the card bus slot, the card bus controller is turned off for lowering power consumption.

2. The computer of claim 1 being a portable computer.

3. The computer of claim 1 wherein the power supply is capable of providing the PCMCIA card with different voltages, and the card bus controller controls the power supply for providing the PCMCIA card with an optimum voltage according to the specification of the PCMCIA card.

4. The computer of claim 1 wherein the detection circuit generates a check signal for informing whether the PCMCIA card has been inserted into the card bus slot, and the processor turns on or turns off the card bus controller according to the check signal.

5. A method for lowering power consumption of a computer, the computer comprising:
 a processor for controlling operation of the computer;
 a card bus slot connected with the processor for connecting to a PCMCIA card;
 a power supply for providing the PCMCIA card inserted into the card bus slot with electric power;
 a card bus controller connected with the processor for controlling the power supply and the PCMCIA card inserted into the card bus slot;
the method comprising:
 detecting whether the PCMCIA card has been inserted into the card bus slot;
 turning on the card bus controller for making the power supply start providing the PCMCIA card with electric power, and providing the PCMCIA card with corresponding services according to a specification of the PCMCIA card for making the PCMCIA card operate correctly when detecting an insertion of the PCMCIA card; and
 turning off the card bus controller for lowering power consumption when there is no PCMCIA card inserted into the card bus slot.

6. The method of claim 5 wherein the computer is a portable computer.

7. The method of claim 5 wherein the power supply is capable of providing the PCMCIA card with different voltages, and the card bus controller controls the power supply for providing the PCMCIA card with an optimum voltage according to the specification of the PCMCIA card.

8. The method of claim 5 wherein the processor turns on or turns off the card bus controller according to a connection status between the card bus slot and the PCMCIA card.

* * * * *